United States Patent
Ujino et al.

(10) Patent No.: US 10,040,025 B2
(45) Date of Patent: Aug. 7, 2018

(54) SOLVENT SEPARATOR AND HEAT TREATMENT APPARATUS

(71) Applicant: Panasonic Intellectual Property Management Co., Ltd., Osaka (JP)

(72) Inventors: Tomohiro Ujino, Osaka (JP); Terutsugu Segawa, Osaka (JP); Koichi Nagai, Kyoto (JP)

(73) Assignee: Panasonic Corporation, Osaka (JP)

( * ) Notice: Subject to any disclaimer, the term of this patent is extended or adjusted under 35 U.S.C. 154(b) by 221 days.

(21) Appl. No.: 14/997,536

(22) Filed: Jan. 17, 2016

(65) Prior Publication Data

US 2016/0310891 A1    Oct. 27, 2016

(30) Foreign Application Priority Data

Apr. 24, 2015    (JP) ................................. 2015-089569

(51) Int. Cl.
*B01D 53/32*    (2006.01)
*F27D 17/00*    (2006.01)

(52) U.S. Cl.
CPC ......... *B01D 53/323* (2013.01); *F27D 17/002* (2013.01); *B01D 2257/708* (2013.01); *B01D 2258/0216* (2013.01); *B01D 2258/06* (2013.01)

(58) Field of Classification Search
CPC ...... B01D 2257/708; B01D 2258/0216; B01D 2258/06; B01D 53/323; F27D 17/002;

(Continued)

(56) References Cited

U.S. PATENT DOCUMENTS

| 5,591,253 A | 1/1997 | Altman et al. |
| 2003/0136020 A1 | 7/2003 | Miller, Jr. et al. |

(Continued)

FOREIGN PATENT DOCUMENTS

| GB | 2346821 B | 4/2003 |
| JP | 48-094954 A | 12/1973 |

(Continued)

OTHER PUBLICATIONS

English Translation of Chinese Search Report dated Apr. 7, 2017 for the related Chinese Patent Application No. 201610074054.1.
English Translation of Chinese Search Report dated Aug. 14, 2017 for the related Chinese Patent Application No. 201610074054.1.

*Primary Examiner* — Scott R Kastler
*Assistant Examiner* — Michael Aboagye
(74) *Attorney, Agent, or Firm* — Panasonic IP Management; Kerry S. Culpepper (57) ABSTRACT

To provide a solvent separator for purifying an exhaust atmosphere efficiently in solvent removal from the exhaust atmosphere containing a vaporized solvent by the heating exhausted from an exhaust generator, so that the vaporized solvent does not slip through an electrode for collecting the solvent and is positively led to the electrode. An electrode is arranged in a first wall surface of a casing of a solvent separation unit having a circular cylindrical shape, thereby inducing a vaporized solvent in an exhaust atmosphere to the electrode by a fan and discharging the solvent to the outside of the separator with part of the peripheral exhaust atmosphere while attracting the solvent to the electrode by an electric field of the electrode.

9 Claims, 7 Drawing Sheets

(58) Field of Classification Search
CPC .. B03C 3/017; B03C 3/06; B03C 3/15; B03C 3/361; B03C 3/368; B03C 3/49
USPC ........ 266/157; 96/15, 18, 28, 29, 62, 63, 65, 96/78
See application file for complete search history.

(56) References Cited

U.S. PATENT DOCUMENTS

| | | |
|---|---|---|
| 2003/0196551 A1 | 10/2003 | Dautenhahn |
| 2004/0120868 A1 | 6/2004 | Nishida et al. |
| 2005/0178270 A1* | 8/2005 | Ito ........................ B01D 53/323 96/18 |
| 2011/0023718 A1* | 2/2011 | Lane ........................ B03C 3/013 96/62 |
| 2015/0122123 A1 | 5/2015 | Segawa et al. |

FOREIGN PATENT DOCUMENTS

| | | |
|---|---|---|
| JP | 50-048574 A | 4/1975 |
| JP | 11-028330 A | 2/1999 |
| JP | 11-104440 A | 4/1999 |
| JP | 2002-248315 | 9/2002 |
| JP | 2003-001411 | 1/2003 |
| JP | 2005-074245 | 3/2005 |
| JP | 2006-087972 | 4/2006 |
| JP | 2014-057935 | 4/2014 |
| JP | 2015-142898 | 8/2015 |

\* cited by examiner

SOLVENT SEPARATOR AND HEAT TREATMENT APPARATUS

TECHNICAL FIELD

The technical field relates to a solvent separator for purifying a gas containing a vaporized solvent by removing the solvent from the gas.

BACKGROUND

Recently, in assembly manufacturing processes of various industrial products or home electric appliances, or in device manufacturing processes of various electronic components, various batteries or substrates to be component parts of these products, heating treatment is performed by various heat treatment apparatuses after applying paste materials having various functions. Here, various heat treatment apparatuses are, for example, a drying furnace, a firing furnace, a curing furnace or a renew furnace used for soldering in a mounting process of electronic components and so on. In respective paste materials, in addition to the adjustment of a solid content finally required for the products, the viscosity adjustment or the performance adjustment is performed by mixing various types of solvents such as water or organic solvents in accordance with respective objects or necessities for applying these pastes to various types of substrates or base materials.

These solvents are discharged into the apparatus from the paste materials through vaporizing and desolvation processes in the heating process in the heat treatment apparatus. Accordingly, in the case where the heating treatment is repeatedly performed, the solvent is continuously vaporized and discharged in the apparatus, as a result, a solvent concentration in an atmosphere inside the apparatus is increased, which say lead to various problems. For example, the amount of the solvent which can exist in the atmosphere at a temperature inside the apparatus becomes close to the saturation as the solvent concentration in the atmosphere inside the apparatus is increased, which makes the drying of an object to be thermally treated difficult. Moreover, a vaporized solvent concentration may exceed explosion limits even when the solvent does not reach the saturated vapor pressure in the case of a solvent having an explosive nature. Therefore, it is necessary to supply outside air into the apparatus from the outside of the apparatus periodically or continuously, or if a nitrogen gas or other atmospheres (atmosphere gases) are necessary, it is necessary to supply these atmospheres from the outside of the apparatus. Furthermore, a means for discharging the atmosphere in the apparatus in which solvent concentration is increased to the outside of the apparatus is adopted at the same time.

Figure 7:
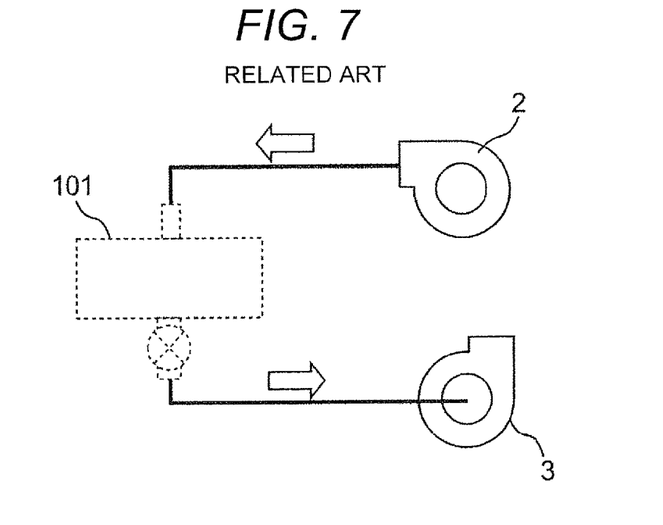
FIG. 7 is an explanatory view for explaining supply and exhaust of an atmosphere in related art.

FIG. 7 is a view for explaining supply and exhaust of the atmosphere. The outside air is supplied into a heat treatment apparatus 101 by an air blower 2. Part of the atmosphere inside the heat treatment apparatus 101 containing a solvent vaporized inside the heat treatment apparatus 101 is discharged to the outside of the apparatus by an exhaust blower 3. As a system of removing the vaporized solvent contained in the exhaust, particularly, water vapor, the system described in JP-A-2006-87972 (Patent Document 1) is known.

Figure 8:
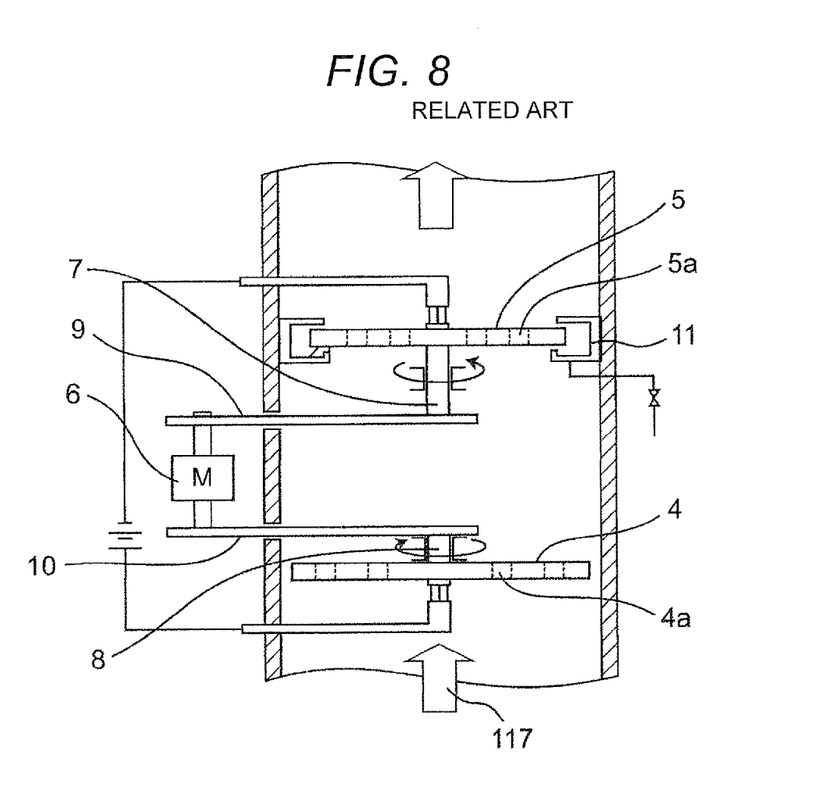
FIG. 8 is an explanatory view of an exhaust purifier in related art.

FIG. 8 is an explanatory view of Patent Document 1. A structure disclosed in Patent Document 1 is as follows. A charging electrode 4 and an attracting electrode 5 rotate around a first rotation axis 7 and a second rotation axis 8 respectively. The first rotation axis 7 and the second rotation axis 8 are respectively connected to a drive motor 6 through a first drive transmission belt 9 and a second drive transmission belt 10. The charging electrode 4 and the attracting electrode 5 rotate by the driving of the drive motor 6. In this case, through holes 4a are disposed in the charging electrode 4 and through holes 5a are disposed in the attracting electrode 5 respectively so that the contact area between the charging electrode 4/the attracting electrode 5 and an exhaust 117 is increased. In the system of Patent Document 1, when the solvent in the exhaust 117 to be supplied is vaporized, the solvent vaporized in an upper stream side of an exhaust flow path is charged by contacting the rotating charging electrode 4 and moves in a direction of the attracting electrode 5 in a lower stream side of the flow path, not by condensing the solvent by cooling. Then, the vaporized solvent is induced by the rotating attracting electrode 5 having charges of a reverse polarity to the polarity of the charged solvent, and the solvent is attracted to the attracting electrode 5. The solvent attracted to the attracting electrode 5 is collected by a water-drop collector 11 by a centrifugal force of the attracting electrode 5.

SUMMARY

However, the attracting electrode 5 is arranged so as to block the exhaust flow path in the structure of Patent Document 1, therefore, it is necessary to provide plural through holes 5a in the attracting electrode 5 for allowing the gas to pass through. Furthermore, as there is a gap between the attracting electrode 5 and a flow path wall surface, the gas containing the solvent slips through the gap or the through holes 5a, then, the solvent is discharged to the lower stream side of the attracting electrode without being removed.

In view of the above, as well as other concerns, an object of the present disclosure is to provide a solvent separator in which the vaporized solvent is removed while being induced to the electrode so that the gas containing the solvent does not slip through the electrode.

According to an embodiment, there is provided a solvent separator as a device for separating a solvent from a gas containing the vaporized solvent having a polarity. The solvent separator includes a casing having a curved inner wall surface of a circular cylindrical structure, an electrode formed on the curved inner wall surface of the casing, a rotation drive unit arranged in one end portion of the casing in an axial direction and inducing the gas to flow from the axial direction to a rotation direction to thereby feed the gas into the casing and first and second exhaust flow paths separated into two paths in the other end portion of the casing in the axial direction which is the opposite side to the rotation drive unit, in which the second exhaust flow path is arranged so as to extend along the electrode, and, in a state where an electric field is applied to the electrode and the solvent contained, in the gas is concentrated to the vicinity of the electrode, the concentrated gas containing the solvent is separated from the gas not containing the solvent and is discharged from the second exhaust flow path where the electrode is arranged, and the gas not containing the solvent is discharged from the first exhaust flow path.

As described above, in solvent removal from an exhaust atmosphere containing a vaporized solvent exhausted from an exhaust generator such as a heat treatment apparatus, the solvent separator according to the embodiment induces a gas containing the solvent to flow in a direction of an electrode arranged in an outer periphery of a flow path and controls the gas to flow along the electrode, not arranging the electrode so as to block the flow path. According to the structure, it is possible to separate the gas containing the solvent from the exhaust atmosphere by allowing the gas containing the solvent to contact the electrode in an outer side wall surface without slipping through the electrode.

DESCRIPTION OF EMBODIMENTS

Hereinafter, various embodiments will be explained with reference to the drawings.

First Embodiment

Figure 1:
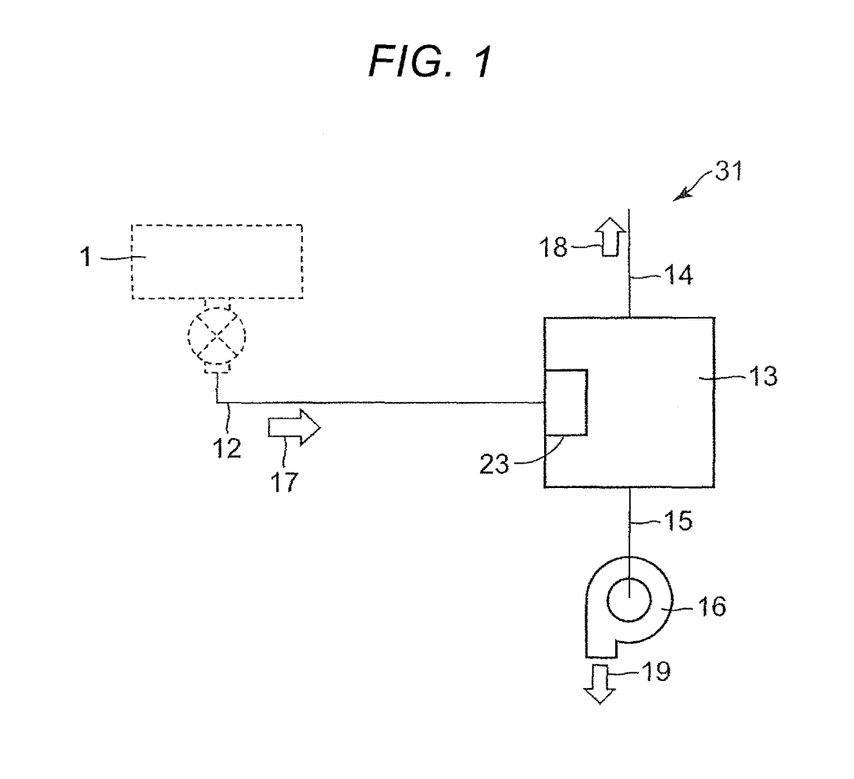
FIG. 1 is an explanatory view of a solvent separator including a solvent separation unit which can separate a solvent according to a first embodiment.

FIG. 1 is an explanatory view of a solvent separator 31 which can separate a solvent according to a first embodiment. The solvent separator 31 is connected to a heat treatment apparatus 1 as an example of an exhaust generator and includes a fan 23, an exhaust duct 12, a solvent, separation unit 13, a first exhaust duct 14, a second exhaust duct 15 and an exhaust blower 16.

The heat treatment apparatus 1 is a furnace performing heating treatment such as, a firing furnace, a drying furnace, a curing furnace or a reflow furnace. In the heating treatment, heating treatment corresponding to various materials or members to be heated is performed, and a solvent 22 is vaporized in an atmosphere (gas) inside the heat treatment apparatus 1 by the heating. Part of the atmosphere inside the heat treatment apparatus 1 containing the vaporized solvent 22 is led to the exhaust duct 12 arranged so as to communicate with the heat treatment apparatus 1.

The solvent separation unit 13 is connected to a lower stream side of the exhaust duct 12 so as to communicate with the exhaust duct 12. An exhaust atmosphere 17 is fed into the solvent separation unit 13 from the heat treatment apparatus 1 through the exhaust duct 12 by the fan 23. The fan 23 is arranged inside the solvent separation unit 13 connecting the exhaust duct 12 and the solvent separation unit 13. The fan 23 indicates a rotation drive unit which induces the gas to flow from an axial direction to a rotation direction of a rotary fan of the fan 23. Then, gas molecules of the vaporized solvent 22 having a polarity in the exhaust atmosphere 17 are separated from gas molecules other than the solvent inside the exhaust atmosphere 17 by electrostatic attraction due to effects of an electric field, which will be described later in detail. As a result, the exhaust atmosphere is separated into a first exhaust atmosphere 18 as a part not containing the solvent 22 and a second exhaust atmosphere 19 as a part containing the solvent 22, and the deviation of solvent concentration occurs in the exhaust atmosphere. Here, electrostatic attraction is the phenomenon that a positively charged substance is attracted to a negative charge and a negatively charged substance is attracted to a positive charge.

The first exhaust atmosphere 18 (the part not containing the solvent 22) and the second exhaust atmosphere 19 (the part containing the solvent 22) are separated from each other in the solvent separation unit 13 and respectively led to the separate first exhaust duct 14 and the second exhaust duct 15 communicating with the solvent separation unit 13. The first exhaust atmosphere 18 not containing the solvent 22 is discharged to the outside of the solvent separation unit 13 through the first exhaust duct 14 by the pressure caused by the fan 23. On the other hand, the second exhaust atmosphere 19 containing the solvent 22 is discharged to the outside of the solvent separation unit 13 through the second exhaust duct 15 by the exhaust blower 16. The ability of the exhaust blower 16 is adjusted so that the inside of the solvent separation unit 13 has a positive pressure with respect to the fan 23.

Figure 2:
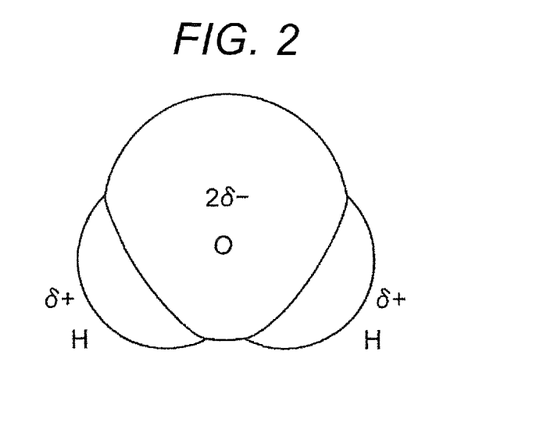
FIG. 2 is an enlarged explanatory view of a molecular structure of water.

FIG. 2 shows a molecular structure of water. As shown in FIG. 2, water has an electrical deviation as it has a polarity due to the relation of the molecular structure. The same applies to other solvents such as ethanol. Substances used as solvents generally nave a nature of easily melting other substances as these substances have the polarity due to the relation of the molecular structure, therefore, they are used as solvents. That is, many substances used as solvents have the polarity. When molecules of a substance having the polarity are put in the electric field, the molecules are attracted to the electrode by the electrostatic attraction even in a case where the electrode which generates the electric field is a positive electrode or a negative electrode. This is because water molecules deviated to the negative side are attracted when the electrode is positively charged, and water molecules deviated to the positive side are attracted when the electrode is negatively charged respectively by the electrostatic attraction.

Figure 3A:
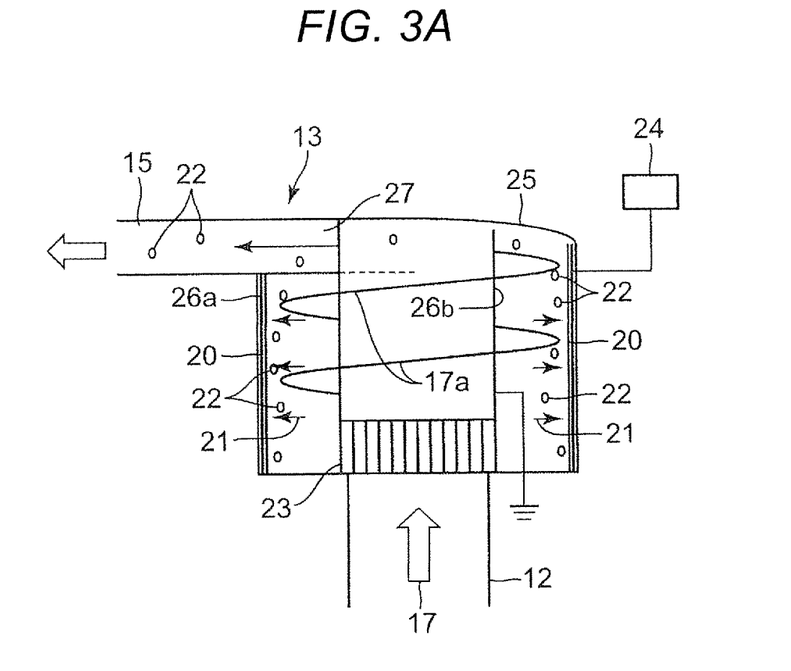
FIG. 3A is an explanatory view of a solvent separation unit according to the first embodiment.
Figure 3B:
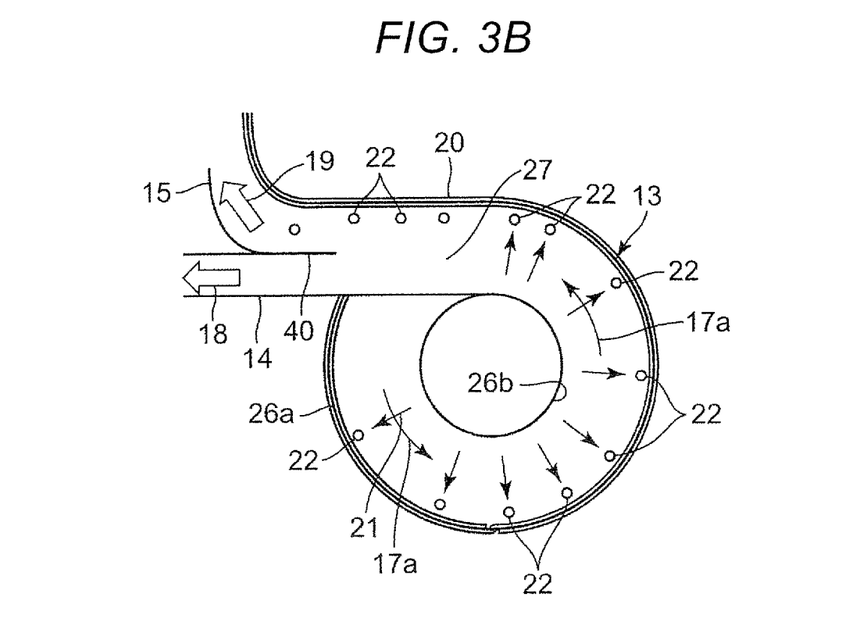
FIG. 3B is an explanatory view of the solvent separation unit according to the first embodiment.

FIG. 3A and FIG. 3B are explanatory views of a solvent separation method according to the first embodiment. A function of separating the solvent 22 inside the solvent separation unit 13 will be explained. The solvent 22 having the polarity is contained in the exhaust atmosphere 17 discharged from the heat treatment apparatus 1 and supplied into the solvent separation unit 13. The solvent separation unit 13 includes a circular cylindrical member 25, the fan 23, an electrode 20, a voltage application device 24 and an outlet duct 27 as part of an outlet of the solvent separation unit 13 as shown in FIG. 3A, and the first exhaust duct 14 and the second exhaust duct 15 connected to the outlet duet 27 as shown in FIG. 3B. The circular cylindrical member 25 functions as an example of a casing having a curved inner wall surface of a circular cylindrical structure inside. The first exhaust duct 14 and the second exhaust duct 15 function as a first exhaust flow path and a second exhaust flow path.

First, for example, in the circular cylindrical member 25 of the solvent separation unit 13, the fan 23 is provided in a central lower end in the circular cylindrical member 25 as shown in FIG. 3A. The fan 23 allows the exhaust atmosphere (gas) 17 to flow in a direction along the surface of a first wall surface 26a as a curved inner wall surface in an outer peripheral portion of the circular cylindrical member 25. In an upper end which is the opposite side to the fan 23 positioned at the central lower end in the circular cylindrical member 25, the outlet duct 27 connecting to the first exhaust duct 14 and the second exhaust duct 15 is installed. On the whole surface of the first wall surface 26a of the circular cylindrical member 25, the electrode 20 is provided inside or outside the first wall surface 26a, which enables the application of voltage from the voltage application device 24. The size of the voltage to be applied is appropriately determined in consideration of the concentration of the solvent 22, the arrangement length of the electrode 20 and the flow velocity of the exhaust astrosphere 17, or the size of the circular cylindrical member 25 and so on. Examples of the solvent 22 are, for example, water, ethanol and so on, and examples of the voltage to be applied are 3 to 8 kV. A second wall surface 26b which is cylindrically curved on the central axis side facing the first wall surface is insulated from the electrode 20 and is connected to the earth.

Moreover, as shown in FIG. 3B, the outlet duct 27 which is part of the outlet side in the upper end of the solvent separation unit 13 is provided with the second exhaust duct 15 along the first wall surface 26a to thereby allow the second exhaust atmosphere 19 containing the solvent 22 concentrated in the vicinity of the electrode 20 to be discharged, from the second exhaust duct 15 to the outside of the solvent separation unit 13. Moreover, the first exhaust duct 14 is provided inside the second exhaust duct 15 so as to extend along a straight advancing direction of the outlet duct 27, which allows the remaining exhaust atmosphere, namely, the first exhaust atmosphere 18 not containing the solvent 22 to be discharged from the first exhaust duct 14 to the outside of the solvent separation unit 13. A partition wall 40 is arranged between the second exhaust duct 15 and the first exhaust duct 14. Therefore, the outlet side of the solvent separation unit 13 branches off into the first exhaust duct 14 and the second exhaust duct 15. The electrode 20 is provided in an area from the first wall surface 26a to at least the branching part on the wall surface of the second exhaust duct 15.

When the voltage is applied from the voltage application device 24 to the electrode 20 by the above structure, a voltage difference is generated between the second wall surface 26b and the electrode 20 arranged in the first wall surface 26a facing the second wall surface 26b, and an electric field 21 is generated inside the solvent separation unit 13. The electric field 21 is generated in a direction orthogonal to a direction 17a in which the exhaust atmosphere flows.

The exhaust atmosphere 17 is fed from the heat treatment apparatus 1 into the solvent separation unit 13 by the fan 23 in the above state. The fed exhaust atmosphere 17 is induced to flow from the axial direction to the rotation direction of the fan 23 (from the axial direction to a peripheral direction of the circular cylindrical member 25) by the fan 23. Then, the exhaust atmosphere 17 rises inside the circular cylindrical member 25 in the direction along the surface of the first wall surface 26a while swirling in a spiral shape. At this time, when the solvent 22 having the polarity in the molecule structure reaches in an area of influence (area in the vicinity of the electrode) of the electric field 21, the solvent 22 is attracted in one direction by the electrostatic attraction, specifically, in the direction of the electrode 20 in FIG. 3A. Respective molecules of the vaporized solvent 22 contained in the exhaust atmosphere 17 are attracted to the electrode 20 side by the electrostatic attraction in the same manner. As a result, the exhaust atmosphere 17 enters the outlet duct 27 connecting to the first exhaust duct 14 and the second exhaust duct 15 through a necessary route length while the solvent 22 contained in the exhaust atmosphere 17 is concentrated in a given area in the vicinity of the electrode 20. As an example of the necessary route length, at least about 50 cm is necessary for achieving effects. As charged particles can be collected in a period of several milliseconds by a force of the electric field, the collection can be achieved with a length of approximately 10 m/s×10 ms=10 cm or more, when the flow velocity inside the device is 10 m/s and the period for collection is 10 ms. When variations in electric field intensity are further considered, at least about 50 cm will be enough as the necessary route length. The second exhaust atmosphere 19 containing the solvent 22 concentrated in the vicinity of the electrode 20 in the exhaust atmosphere 17 entering into the outlet duct 27 is discharged from the second exhaust duct 15 to the outside of the solvent separation unit 13. On the other hand, the first exhaust atmosphere 18 apart from the electrode 20 and not containing the solvent 22 is discharged from the first exhaust duct 14 to the outside of the solvent separation unit 13.

In the solvent separator according to the first embodiment, the exhaust, atmosphere 17 containing the solvent 22 is induced to the direction of the electrode 20 arranged in the outer periphery of the flow path and is controlled to flow along the electrode 20 without arranging the electrode so as to block the flow path, therefore, the gas containing the solvent 22 does not slip through the electrode and the vaporized solvent 22 can be removed while being induced by the electrode 20. Accordingly, also when the vaporized solvent 22 contained in the exhaust atmosphere 17 discharged from the heat treatment apparatus 1 is removed, the gas containing the solvent 22 contacts the electrode 20 on the outer wall surface without slipping through the electrode 20, thereby separating the gas containing the solvent 22 from the exhaust atmosphere 17.

Second Embodiment

Figure 4A:
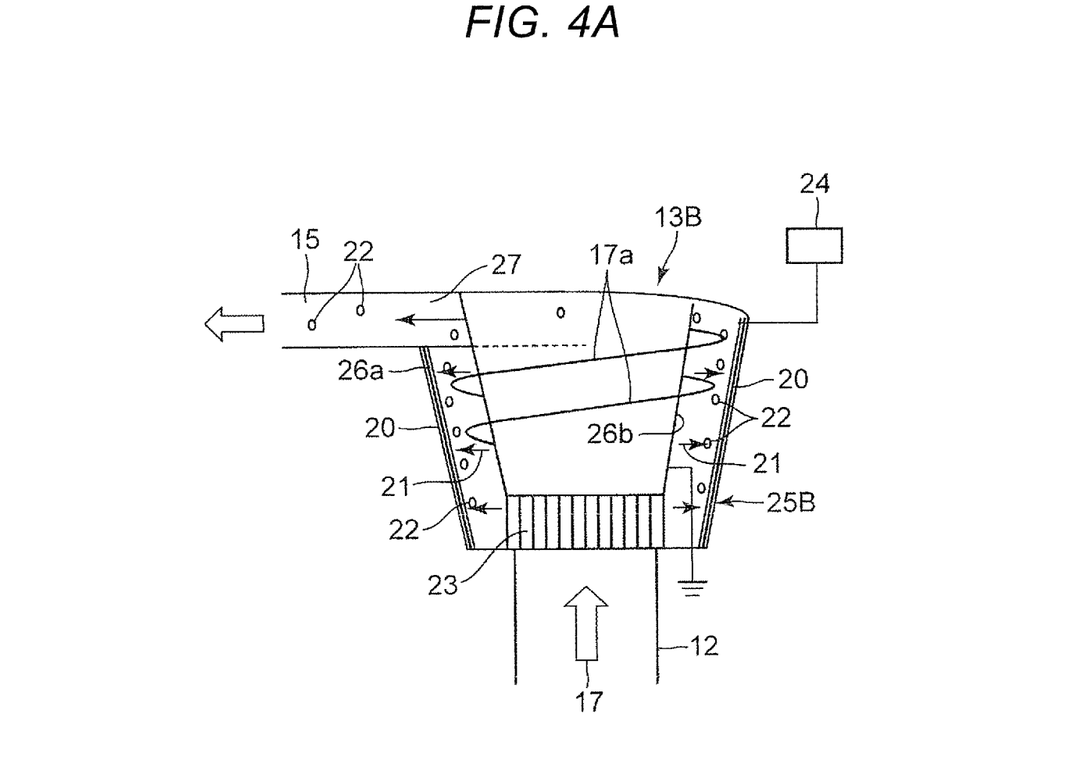
FIG. 4A is an explanatory view of a solvent separation unit according to a second embodiment.

FIG. 4A is an explanatory view of a solvent separator according to a second embodiment. In the second embodiment, there is provided, a solvent separation unit 133 in which the first wall surface 26a, the second wall surface 26b and the electrode 20 are formed by a frustum cylindrical member 25B having a tapered structure in which a diameter increases from the end portion (lower end portion) where the fan 23 is installed to the end portion of the opposite side (upper end portion), instead of the solvent separation unit 13 according to the first embodiment. In other words, the frustum cylindrical member 25B and the electrode 20 respectively have tapered structures in which diameters increase from the inlet-side end portion of the exhaust atmosphere 17 to the outlet-side end portion. The frustum cylindrical shape is an example of a circular cylindrical structure.

The solvent separation unit 13B can release the exhaust atmosphere 17 colliding with the first wall surface 26a to the direction of the first exhaust duct 14 and the second exhaust duct 15 of the solvent separation unit 13B as the first wall surface 26a is obliquely inclined with respect to a flow-velocity vector of the exhaust atmosphere 17. Accordingly, the exhaust atmosphere 17 containing the solvent 22 flowing from the fan 23 can be led to the first exhaust duct 14 and the second exhaust duct 15 while reducing the pressure applied to the first wall surface 26a and suppressing the bounce of the exhaust atmosphere 17 from the first wall surface 26a.

Figure 4B:
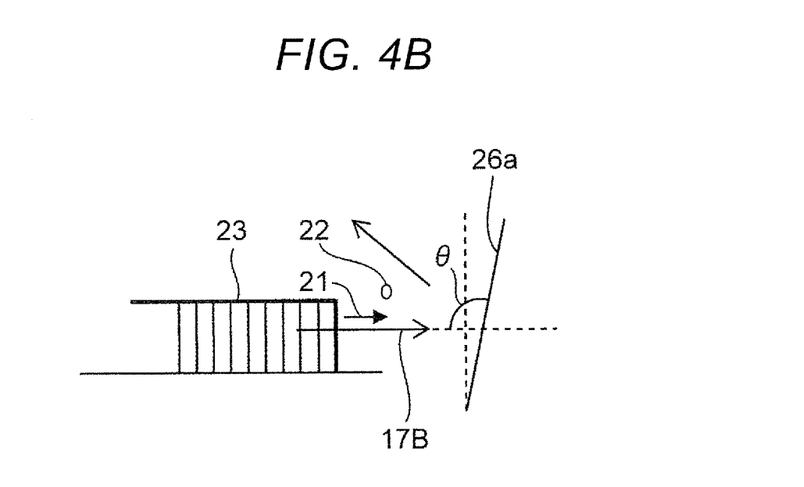
FIG. 4B is an enlarged explanatory view of a taper angle of a first wall surface of the solvent separation unit according to the second embodiment.
Figure 4C:
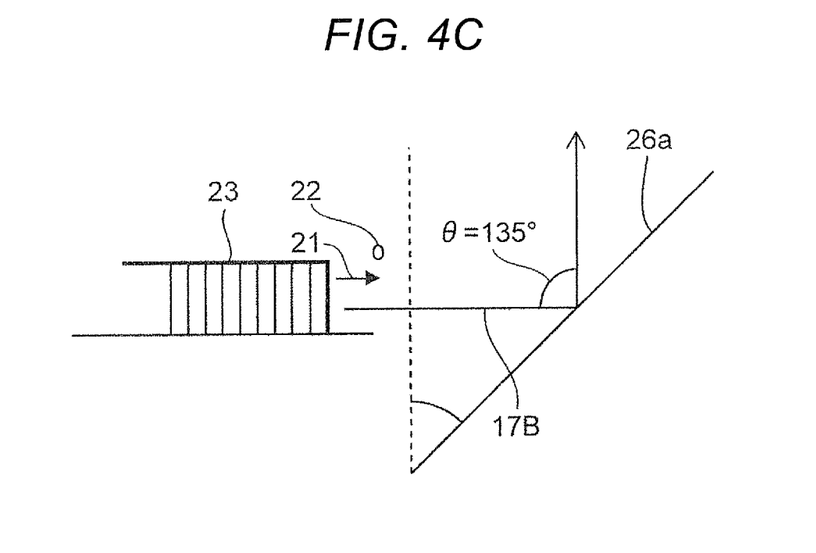
FIG. 4C is an enlarged explanatory view of a taper angle of the solvent separation unit according to the second embodiment.

The taper angle of the first wall surface 26a is appropriately determined in consideration of the flow velocity of the exhaust atmosphere 17 or the size of the circular cylindrical member 25. A range of a taper angle θ of the first wall surface 26a will be explained. As an example, as shown in FIG. 4B and FIG. 4C, when the angle θ made by the flow-velocity vector 17B of the exhaust atmosphere 17 blown out in a horizontal direction from the fan 23 and the first wall surface 26a is larger than 90 degrees, the flow-velocity vector of gas particles obtained after the collision with respect to the first wall surface 26a points upward where the exhaust ducts 14 and 15 exist, therefore, the collision of gas particles with one another due to the bounce can be reduced and a bounce pressure of solvent particles from the first wall surface 26a can be also relaxed. On the other hand, when the angle θ is larger than 135 degrees, part of the solvent 22 may reach the exhaust ducts 14 and 15 without approaching the first wall surface 26a and the efficiency of collecting the solvent 22 may be reduced. The ratio of such solvent 22 tends to be increased as the angle θ is increased. Therefore, the taper angle θ of the first wall surface 26a is preferably 90 degrees or more to 135 degrees or less. Also in the second embodiment, the same effects as the first embodiment can be obtained.

Third Embodiment

Figure 5A:
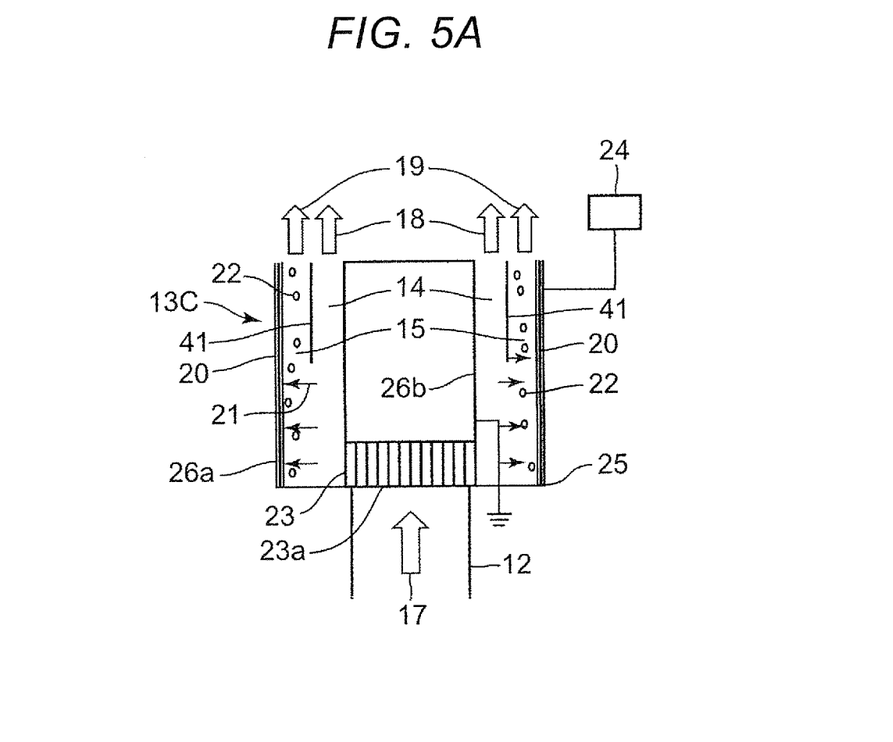
FIG. 5A is an explanatory view of a solvent separation unit according to a third embodiment.
Figure 5B:
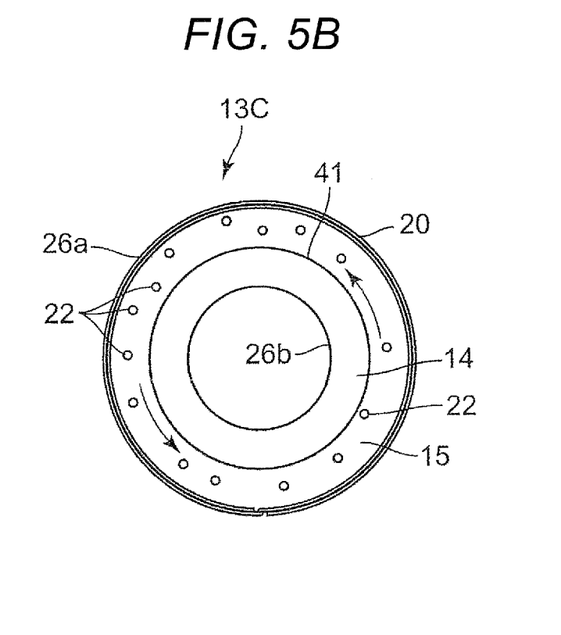
FIG. 5B is an explanatory view of the solvent separation unit according to the third embodiment.

FIG. 5A and FIG. 5B are explanatory views of a solvent separator according to a third embodiment. In the third embodiment, a solvent separation unit 13C is arranged instead of the solvent separation unit 13 according to the first embodiment. In the solvent separation unit 13C, the first exhaust duct 14 and the second exhaust duct 15 of the solvent separation unit 13 are separated into a central axis side and an outer peripheral side of the circular cylindrical member 25 by a partition tube 41 as an example of a partition portion arranged in an upper part, for example, in an upper end side of the circular cylindrical member 25. Then, the electrode 20 is arranged in the first wall surface 26a as an inner wall of the outer peripheral portion of the circular cylindrical member 25, and the electrode 20 is extended to the second exhaust duct 15 in the outer peripheral side. The partition tube 41 is arranged in a portion of approximately half of the entire length of the circular cylindrical member 25 in the axial direction as well as in the upper end side, and the second exhaust atmosphere 19 containing the solvent 22 is separated from the exhaust atmosphere 17 in a portion where the partition tube 41 does not exist.

The exhaust atmosphere 17 flowing into the circular cylindrical member 25 from the fan 23 is induced to flow in a circumferential direction in the first wall surface 26a side by a centrifugal force of the fan 23. The solvent 22 in the exhaust atmosphere 17 is concentrated to the vicinity of the first wall surface 26a by the electric field 21 of the electrode 20 arranged in the first wall surface 26a. The second exhaust atmosphere 19 containing the solvent 22 concentrated to the vicinity of the first wall surface 26a is discharged from the second exhaust duct 15 in the outer peripheral side of the partition tube 41 to the outside of the solvent separation unit 13C. Then, the remaining exhaust atmosphere, namely, the first exhaust atmosphere 18 not containing the solvent 22 is discharged from the first exhaust duct 14 in the central axis side of the partition tube 41 to the outside of the solvent separation unit 13.

The electrode 20 is provided so as to extend to, at least a branching part of the second exhaust duct 15 by the partition tube 41 in the first wall surface 26a.

Figure 5C:
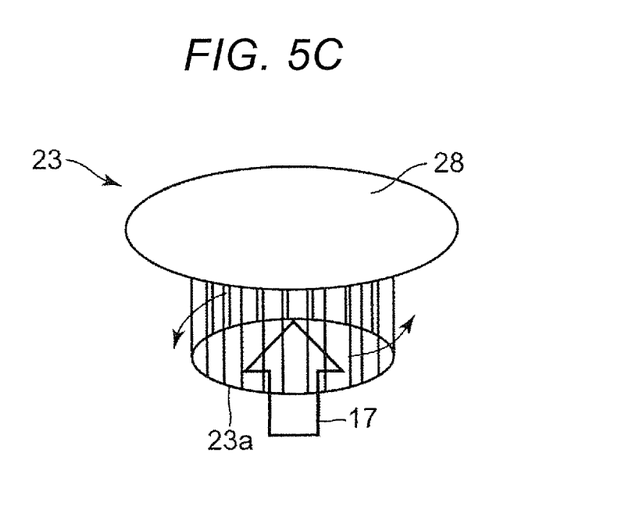
FIG. 5C is a perspective view of a fan provided with a partition.

Furthermore, a diameter of a circular partition plate 23 in the opposite side of an inlet port 23a of the fan 23 is formed to be larger than a diameter of the fan 23 as shown in FIG. 5C, thereby allowing the solvent 22 contained in the exhaust atmosphere 17 flowing into the circular cylindrical member 25 from the fan 23 to forcibly approach the electrode 20 by the circular partition plate 28. As a result, it is possible to inhibit the solvent 22 contained in the exhaust atmosphere 17 from flowing to the first exhaust duct 14 in the central axis side without approaching the electrode 20.

In the case of the third embodiment, the areas of the first exhaust duct 14 and the second exhaust duct 15 can be increased as compared with the first embodiment and the second embodiment, the pressure loss caused by the solvent separator can be reduced in addition to the effects of the first embodiment.

Fourth Embodiment

Figure 6A:
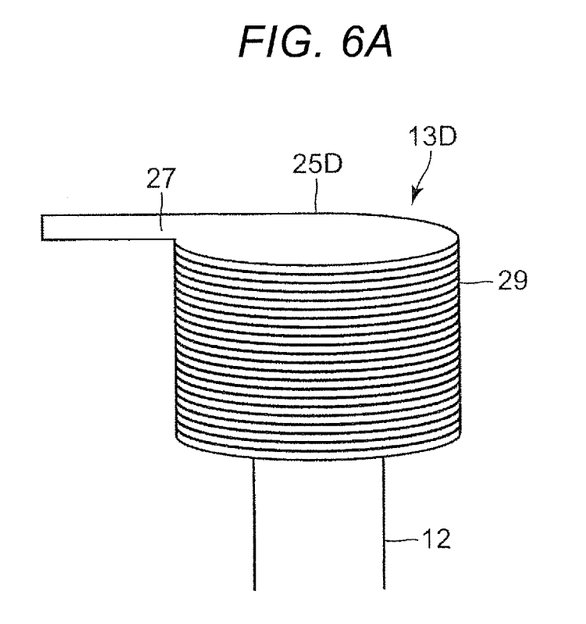
FIG. 6A is an explanatory view of a solvent separation unit according to a fourth embodiment.
Figure 6B:
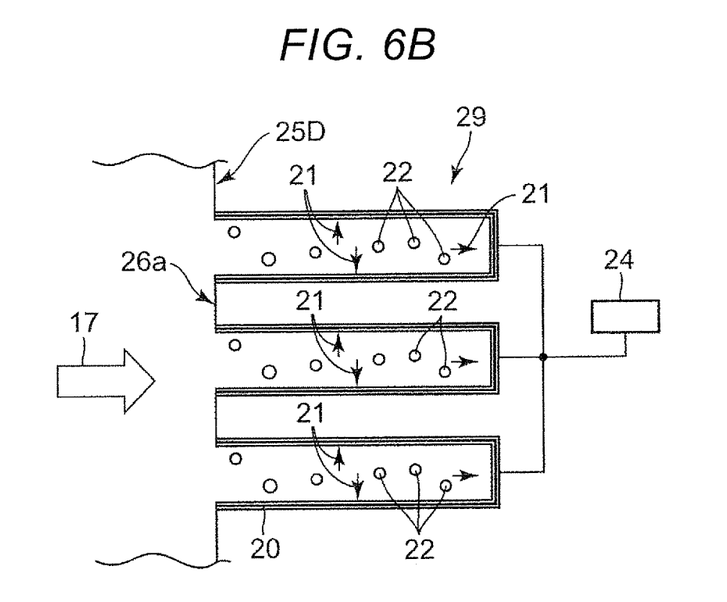
FIG. 6B is an explanatory view of an electrode of FIG. 6A.

FIG. 6A is an explanatory view of a solvent separator according to a fourth embodiment. In the fourth embodiment, a solvent separation unit 13D is arranged instead of the solvent separation unit 13 of the first embodiment. The solvent separation unit 13D has a shape in which plural grooves 29 are formed on a wall surface of an outer peripheral portion of a circular cylindrical member 25D as shown in FIG. 6A. The grooves 29 are arranged so as to extend from a lower end of the circular cylindrical member 25D to the second exhaust duct 15. FIG. 6B is an enlarged view of an outer peripheral portion of FIG. 6A, in which the electrode 20 is arranged in flat surfaces along the horizontal direction of the groove 29 and in wall surfaces along a vertical direction in the outermost side (bottom side seen from the inside) of the grooves 29 respectively so as to correspond to the shape of the grooves 29. The solvent 22 contained in the exhaust atmosphere flowing from the fan 23 is led into the grooves 29 by the centrifugal force of the fan 23 and flows toward the second exhaust duct 15 while being collected inside the grooves 29 by the electric field 21 of the electrode 20. As the electrode 20 having the shape in which plural grooves 29 are formed is provided, the electric field 21 applied by the electrode 20 is given to the solvent 22 from three directions which are upper and lower directions and a diameter direction as shown in FIG. 6B, which inhibits the solvent 22 from separating from the electrode 20. The width and the depth of the grooves 29 are appropriately determined in consideration of the flow velocity of the exhaust atmosphere 17, the size of the circular cylindrical member 25 or the like. Although there are effects for leading the gas containing the solvent along the wall surface even when the electrode is not formed in the upper and lower directions of the grooves, it is preferable that the electrode is formed in the upper and lower directions of the grooves as the range affected by the electric field is widened.

In addition to the effects of the first embodiment, it is possible to inhibit the solvent 22 from separating from the electrode 20 by providing the electrode 20 having the shape in which the plural grooves 29 are formed and applying the electric field 21 from the three directions which are the upper and lower directions and the diameter direction, and the efficiency of separating the solvent 22 can be improved by leading the solvent 22 to the second exhaust duct 15 while concentrating the solvent 22 in the vicinity of the electrode 20.

An arbitrary embodiment and a modification example in the above various embodiments and modification examples are appropriately combined, thereby obtaining effects possessed by these examples. It is possible to combine embodiments with each other, to combine examples with each other, or to combine an embodiment with an example as well as to combine different embodiments with each other or to combine characteristics in examples with each other.

As the solvent separator can separate the solvent contained in the exhaust atmosphere efficiently so that the gas containing the solvent does not slip through the electrode, the solvent separator can be applied, as the device in which the use amount of atmosphere is small, to an exhaust generator for the heat treatment apparatuses and the like, which perform various heat treatments such as the drying furnace, the firing furnace, the curing furnace or the reflow furnace in manufacturing processes of various industrial products or home electric appliances, or in manufacturing processes of various electronic components.

What is claimed is:

1. A solvent separator as a device for separating a solvent from a gas containing a vaporized solvent having a polarity comprising:
    a circular cylindrical shaped casing having a curved inner wall surface;
    an electrode formed on the curved inner wall surface of the casing;
    a rotation drive unit arranged in a first end portion of the casing in an axial direction for inducing the gas to flow from the axial direction to a rotation direction to thereby feed the gas into the casing, wherein the inducing the gas to flow includes:
        changing a flow direction of a gas drawn in the axial direction from the axial direction to a direction toward the curved inner wall surface of the casing and then moving along the curved inner wall surface in the casing from one end in the axial direction of the casing so as to flow while spirally turning toward the other end; and
    first and second exhaust flow paths separated into two paths in a second end portion of the casing in the axial direction which is an opposite side to the rotation drive unit,
    wherein the second exhaust flow path is arranged so as to extend along the electrode, and,
    in a state where an electric field is applied to the electrode and the solvent contained in the gas is concentrated to a vicinity of the electrode, a concentrated gas containing the solvent is separated from a gas not containing the solvent and is discharged from the second exhaust flow path where the electrode is arranged, and the gas not containing the solvent is discharged from the first exhaust flow path, and
    an exhaust duct is provided at one end in an axial direction of the casing,
    wherein the first and second exhaust flow paths are provided at an other end portion in the axial direction of the casing opposed to the exhaust duct.

2. The solvent separator according to claim 1,
    wherein the casing has a tapered shape in which a diameter increases from one of the first and second end portions toward an other of the first and second end portions.

3. The solvent separator according to claim 2,
    wherein the first and second exhaust flow paths are separated respectively into a central axis side and an outer peripheral side of the casing by a partition portion inside an upper part of the casing, and
    the gas containing the solvent is exhausted from the second exhaust flow path in the outer peripheral side and the gas from which the solvent is separated is exhausted from the first exhaust flow path in the central axis side.

4. The solvent separator according to claim 2,
    wherein plural grooves are formed in an inner wall surface of the casing, and
    the electrode is formed in inner wall surfaces of the grooves.

5. A heat treatment apparatus comprising:
    the solvent separator according to claim 1 which is communicated with an exhaust unit.

6. The solvent separator according to claim 1,
    wherein the first and second exhaust flow paths are separated respectively into a central axis side and an outer peripheral side of the casing by a partition portion inside an upper part of the casing, and
    the gas containing the solvent is exhausted from the second exhaust flow path in the outer peripheral side and the gas from which the solvent is separated is exhausted from the first exhaust flow path in the central axis side.

7. The solvent separator according to claim 1,
    wherein plural grooves are formed in an inner wall surface of the casing, and
    the electrode is formed in inner wall surfaces of the grooves.

8. A solvent separator as a device for separating a solvent from a gas containing a vaporized solvent having a polarity comprising:
    a circular cylindrical shaped casing having a curved inner wall surface;
    an electrode formed on the curved inner wall surface of the casing;
    a rotation drive unit arranged in a first end portion of the casing in an axial direction, and inducing the gas to flow from the axial direction to a rotation direction to thereby feed the gas into the casing;
    a partition plate having a diameter larger than that of the rotation drive unit is disposed on an opposite side of an inlet port of the rotation drive unit in an axial direction of the rotation drive unit; and
    first and second exhaust flow paths separated into two paths in a second end portion of the casing in the axial direction which is an opposite side to the rotation drive unit,
    wherein the second exhaust flow path is arranged so as to extend along the electrode,
    in a state where an electric field is applied to the electrode and the solvent contained in the gas is concentrated to a vicinity of the electrode, a concentrated gas containing the solvent is separated from a gas not containing the solvent and is discharged from the second exhaust flow path where the electrode is arranged, and the gas not containing the solvent is discharged from the first exhaust flow path, wherein the casing has a tapered shape in which a diameter increases from one of the first and second end portions toward an other of the first and second end portions.

9. A solvent separator as a device for separating a solvent from a gas containing a vaporized solvent having a polarity comprising:

a circular cylindrical shaped casing having a curved inner wall surface;

an electrode formed on the curved inner wall surface of the casing;

a rotation drive unit arranged in a first end portion of the casing in an axial direction, and inducing the gas to flow from the axial direction to a rotation direction to thereby feed the gas into the casing;

a partition plate having a diameter larger than that of the rotation drive unit is disposed on an opposite side of an inlet port of the rotation drive unit in an axial direction of the rotation drive unit; and first and second exhaust flow paths separated into two paths in a second end portion of the casing in the axial direction which is an opposite side to the rotation drive unit, wherein the second exhaust flow path is arranged so as to extend along the electrode, in a state where an electric field is applied to the electrode and the solvent contained in the gas is concentrated to a vicinity of the electrode, a concentrated gas containing the solvent is separated from a gas not containing the solvent and is discharged from the second exhaust flow path where the electrode is arranged, and the gas not containing the solvent is discharged from the first exhaust flow path.

* * * * *